United States Patent [19]

Pettit, Jr.

[11] 3,862,063
[45] Jan. 21, 1975

[54] THERMOSETTING ACRYLIC POWDER OF AN ACRYLIC POLYMER HAVING A HIGH GLASS TRANSITION TEMPERATURE, CELLULOSE ACETATE BUTYRATE, A REACTIVE PLASTICIZER AND A CROSS-LINKING AGENT

[75] Inventor: Paul H. Pettit, Jr., Wilmington, Del.

[73] Assignee: E. I. du Pont de Nemours and Company, Wilmington, Del.

[22] Filed: Oct. 9, 1973

[21] Appl. No.: 406,651

Related U.S. Application Data

[63] Continuation-in-part of Ser. No. 310,952, Nov. 30, 1972, abandoned.

[52] U.S. Cl............ 260/15, 117/161 C, 117/161 K, 117/161 LN, 117/161 UZ, 117/161 UT, 117/161 UC, 117/166, 117/21, 117/132 B, 260/17, 260/31.8 M
[51] Int. Cl............................................ C08b 21/08
[58] Field of Search....... 260/15; 117/161 C, 161 K, 117/161 LN, 161 UZ, 161 UT, 161 UC, 166, 17

[56] References Cited
UNITED STATES PATENTS

| | | | |
|---|---|---|---|
| 3,058,951 | 10/1962 | Flowers | 260/45.5 |
| 3,265,645 | 8/1966 | Coney et al | 260/15 |
| 3,429,840 | 2/1969 | Lowe et al | 260/15 |
| 3,491,037 | 1/1970 | Keys et al | 260/15 |
| 3,657,001 | 4/1972 | Parker | 260/15 |
| 3,713,872 | 1/1973 | Porter et al | 117/75 |
| 3,758,635 | 9/1973 | Labana et al | 260/836 |
| 3,784,501 | 1/1974 | Pettit | 260/31.6 |

Primary Examiner—Melvin Goldstein
Assistant Examiner—Edward Woodberry

[57] ABSTRACT

The thermosetting acrylic polymer powder coating composition comprises finely divided particles that have a diameter of 1–100 microns wherein the powder particles are a blend of A. 50–85% by weight of acrylic polymer of methyl methacrylate or styrene, an alkyl methacrylate having 8–12 carbon atoms in the alkyl group or an alkyl acrylate having 2–12 carbon atoms in the alkyl group, a hydroxy alkyl acrylate or hydroxy alkyl methacrylate that has 2–4 carbon atoms in the alkyl group; the acrylic polymer has a weight average molecular weight of 10,000–25,000 and glass transition temperature of 71°–95°C and preferably is hydroxyl terminated;

B. 5–25 percent by weight of cellulose acetate butyrate;

C. 4.98–25 percent by weight of an alkylated melamine formaldehyde resin;

D. 5–15 percent by weight of a dihydroxy functional plasticizer;

E. 0.02–5.0% by weight of an acid catalyst blocked with a blocking agent;

the novel thermosetting acrylic powder coating composition is particularly useful as an exterior finish for automobile and truck bodies.

10 Claims, No Drawings

3,862,063

THERMOSETTING ACRYLIC POWDER OF AN ACRYLIC POLYMER HAVING A HIGH GLASS TRANSITION TEMPERATURE, CELLULOSE ACETATE BUTYRATE, A REACTIVE PLASTICIZER AND A CROSS-LINKING AGENT

CROSS REFERENCE TO RELATED APPLICATIONS

This application is a continuation-in-part of my copending application Ser. No. 310,952 filed Nov. 30, 1972 and now abandoned.

BACKGROUND OF THE INVENTION

This invention is related to powder coating compositions and in particular, to a thermosetting acrylic polymer powder coating composition.

Thermosetting powder coating compositions of epoxy resins are well known in the art as shown in Elbling U.S. Pat. No. 3,039,987, issued June 19, 1962 and Winthrop et al. U.S. Pat. No. 3,102,043, issued Aug. 27. 1963. Thermosetting powder coating compositions of any epoxy resin, a polyvinyl acetal resin and a polyacrylate resin are disclosed in Flowers et al. U.S. Pat. No. 3,058,951, issued Oct. 16, 1962. In general, the epoxy powder coatings have poor outdoor durability making these coatings unacaceptable for exterior use on automobile and truck bodies. The thermosetting acrylic powders heretofore known in the art in general have a poor appearance caused by inadequate flow of the finish during baking and often the finish contains small craters caused by popping during the baking cycle. These defects make the compositions unacceptable for an exterior finish for automobile and truck bodies.

To curb pollution caused by conventional solvent based coating systems, the automobile and truck manufacturing industry intends to utilize powder coating compositions. However, the industry demands that these powder coating compositions be of a high quality. The novel thermosetting acrylic polymer powder coating composition of this invention provides a high quality, smooth, glossy, durable finish that has an excellent appearance as is required for the exterior finishes of automobile and truck bodies.

SUMMARY OF THE INVENTION

The thermosetting acrylic powder coating composition of this invention comprises finely divided particles that have a particle size of 1–100 microns; the powder particles are an intimate blend of the following constituents;

A. 50–85 percent by weight of an acrylic polymer of
  1. 70–97 percent by weight of methyl methacrylate, styrene or a mixture of methyl methacrylate and styrene;
  2. 1–10 percent by weight of an alkyl acrylate having 2–12 carbon atoms in the alkyl group or an alkyl methacrylate having 8–12 carbon atoms in the alkyl group;
  3. 2–20 percent by weight of a hydroxy alkyl acrylate or a hydroxy alkyl methacrylate that has 2–4 carbon atoms in the alkyl group;

wherein the acrylic polymer has a glass transition temperature of about 71°–95°C., a weight average molecular weight 10.000–25,000 and preferably the polymer has terminal hydroxyl groups;

B. 5–25 percent by weight of a cellulous acetate butyrate having a butyryl content of 30–60 percent by weight and a viscosity of 0.005–2.0 seconds measured at 25°C. according to ASTM-D-1343'-56;

C. 4.98–25 percent by weight of an alkylated melamine formaldehyde resin having a ratio of —CH$_2$OR groups to —CH$_2$OH groups of at least 5:1 where r is an alkyl group having 1–8 carbon atoms;

D. 5–15 percent by weight of a dihydroxy functional plasticizer having a number average molecular weight of about 520–4,000; and E. 0.02–5.0 percent by weight of an acid catalyst blocked with a blocking agent.

DESCRIPTION OF THE INVENTION

The novel thermosetting acrylic powder coating composition of this invention has powder particles that preferably are 10–75 microns in diameter and more preferably 20–55 microns in diameter.

The powder particles can be pigmented or unpigmented but usually contain about 0.2–50 percent by weight of pigment. Any of the conventional inorganic pigments, organic dyes, organic pigments, and lakes can be used.

About 50–85 pervent by weight, based on the weight of the film-forming constituents in the powder coating composition, of an acrylic polymer is utilized and preferably about 55–65 percent by weight of the acrylic polymer is used. The acrylic polymer has a weight average molecular weight of about 10,000–25,000, preferably 14,000–18,000, and a number average molecular weight of about 4,000–12,000, and preferably, 7,000–10,000 and more preferably 6,000–8,000. Both the number and weight average molecular weight of the acrylic polymer are determined by gel permeation chromatography using polymethyl methacrylate as the standard.

The acrylic polymer is prepared by conventional solution, emulsion or bead polymerization techniques and by using conventional polymerization catalysts.

The acrylic polymer can be prepared by conventional solution polymerization techniques in which the monomer constituents are blended with solvents and a polymerization catalyst and the reaction mixture is heated to 55°–150°C. for about 2-6 hours to form a polymer that has a weight average molecular weight of about 10,000–25,000.

Typical solvents which are used to prepare the acrylic polymer are toluene, ethyl acetate, acetone, methylisobutyl ketone, methylethyl ketone, ethyl alcohol, and other aliphatic, cycloaliphatic and aromatic hydrocarbons, esters, ethers, ketones, and alcohols. Solvents having a boiling point below 100°C. are preferred to facilitate spray drying of the composition or solvent removal by vacuum extrusion to form the novel powder coating composition.

About 0.1–4 percent by weight, based on the weight of the monomers, of a polymerization catalyst is used to prepare the acrylic polymer. Typical catalysts are azo-bis (α, grammadimethyl-valeronitrile), benzoyl peroxide, t-butyl peroxy pivalate, azobisisobutyronitrile and the like. Up to about 5 percent by weight of a chain transfer agent can be used to control molecular weight such as dodecyl mercaptan or 2-mercaptoethanol with is preferred. Preferably, a sufficient amount of a hydroxyl containing chain transfer agent such as 2-mercaptoethanol is used to provide the acrylic polymer with terminal hydroxyl groups.

The acrylic polymer can be prepared by an emulsion polymerization process in which the monomers and an aqueous solution of a free radical catalyst are simultaneously and continuously fed into a polymerization vessel containing water, and a suitable emulsifying agent. The polymerization is carried out in a vessel equipped with a reflux condenser, preferably, under an inert atmosphere, utilizing polymerization temperatures of about 20°–90°C. Typical free radical catalysts that can be used are as follows: potassium persulphate, water-soluble peroxides, such as hydrogen peroxide. A redox type catalyst such as a mixture of ammonium persulfate and sodium bissulfite, is preferred. If a redox catslyst is used, 0.1–5 parts per million of iron, based on the weight of water, in the form of a soluble iron salt such a ferrous sulfate should be added to the reaction mixture. Any active anionic or nonionic surfactant or combination thereof can be used as an emulsifying agent. An ammonium or volatile amine salt of a sulfated or sulfonated surfactant, such as ammonium lauryl sulfate, is preferred.

The acrylic polymer can also be prepared by suspension or bead polymerization techniques as disclosed in W. R. Sorenson and T. W. Campbell, *Preparative Methods for Polymer Chemistry*, Interscience Publishers, New York, 2nd Ed. 1968, page 254.

the acrylic polymer utilized in the novel powder coating composition of this invention contains about 70–97 percent by weight of methyl methacrylate, styrene, or a mixture of methyl methacrylate and styrene, 1–10 percent by weight of an alkyl methacrylate having 8–12 carbon atoms in the alkyl group or an alkyl acrylate having 2–12 carbon atoms in the alkyl group and 2–20 percent by weight of a hydroxy alkyl methacrylate or a hydroxy alkyl acrylate having 2-4 carbon atoms in the alkyl group. Optionally, about 0.1–1 percent by weight of an $\alpha,\beta$-ethylenically unsaturated carboxylic acid such as acrylic acid, methacrylic acid or itaconic acid can be included in the acrylic polymer.

Typical of the above alkyl acrylates and alkyl methacrylates that can be used to prepare the acrylic polymer are as follows:
ethyl acrylate, propyl acrylate, isopropyl acrylate, butyl acrylate, isobutyl acrylate, hexyl acrylate, 2-ethylhexyl acrylate, nonyl acrylate, decyl acrylate, lauryl acrylate, and the like, 2-ethylexyl methacrylate, nonyl methacrylate, decyl methacrylate and lauryl methacrylate, and the like.

Typical hydroxy alkyl acrylates and methacrylates which can be used to prepare the acrylic polymer are 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, and the like.

One particularly useful type of acrylic polymer containes 85–94 percent by weight of methyl methacrylate, 1–5 percent by weight of lauryl methacrylate and 4–10 percent by weight of hydroxyethyl acrylate. Other acrylic polymers contain 89 percent methyl methacrylate, 3 percent lauryl methacrylate, 4 percent 2-hydroxyethyl acrylate, and 4 percent 2-hydroxypropyl methacrylate; 87 percent methyl methacrylate, 3 percent lauryl methacrylate and 10 percent 2-hydroxypropyl methacrylate.

The novel powder coating composition of this invention contains 5–25 percent by weight of cellulose acetate vutyrate and preferably 12–20 percent by weight of cellulose acetate butyrate. The cellulose acetate butyrate has a viscosity of 0.005–2.0 seconds and preferably 0.01–2.0 seconds measured according to ASTM-D-1343-56 at 25°C. and has butyryl content of about 30–60 percent by weight. One particularly preferred cellulose acetate butyrate has a viscosity of 0.02–0.1 second and butyryl content of 50–60 percent and another particularly preferred cellulose acetate butyrate has a viscosity of about 0.008–0.02 seconds and a butyryl content of about 55 percent. The cellulose acetate butyrate provides an excellent appearance to the finish prepared from the novel composition and also provides good crack resistance and crater resistance.

About 4.98–25 percent by weight, based on the weight of the film-forming constituents of the novel powder coating composition of an alkylated melamine formaldehyde resin having 1–8 carbon atoms in the alkyl group is used. These alkylated melamine resins are those that are well known in the art and are prepared by conventional techniques in which a lower alcohol such as methanol, ethanol, butanol, isobutanol, propanol, isopropanol, 2-butoxyethanol and the like, is reacted with the melamine formaldehyde to provide pendent alkoxy groups. The ratio of the —CH$_2$OR groups to the —CH$_2$OH groups of the alkylated melamine formaldehyde should be at least 5:1. R is an alkyl group having 1–8 carbon atoms and is from the lower alkyl alcohol used to prepare the alkylated melamine formaldehyde.

One particularly preferred melamine used in this invention because of its stability in the powder and since it forms a high quality coating is hexa(methoxymethyl) melamine "Cymel" 300 and 303 are highly preferred hexa(methoxymethyl) melamine resins that are used to form the novel powder coating composition of this invention and providing a finish with an excellent appearance. Preferably, 7–12 percent by weight based on the weight of the film-forming constituents of the powder coating composition of hexa(methoxymethyl) melamine resin is used.

The novel powder coating composition of this invention contains about 5–15 percent by weight and preferably 8–14 percent by weight of a dihydroxy functional plasticizer. These plasticizers are cross-linked with the other constituents in the novel powder coating compositon and provide a high quality film. The typical hydroxyl terminated polyesters that can be utilized have a number average molecular weight of about 520–4,000 and are as follows: adipic acid/butanediol-/ethylene glycol; phthalic anhydride/butanediol/ethylene glycol; adipic acid/ neopentyl glycol/ehtylene glycol; and 1,6-hexanediol/ adipic acid/isophthalic acid.

Hydroxyl terminated polycaprolactones can also be used as the plasticizer. These polycaprolactones have a molecular weight in the range of 520–2,000. One preferred polycaprolactone has a molecular weight of 1,100–1,400 and more preferably, has a molecular weight of about 1,250.

About 0–6 percent of other non-reactive monomeric and polymeric plasticizers can be used in the novel powder coating composition of this invention. Phthalate ester plasticizers in particular the alkyl and cycloalkyl ester phthalates in which the alkyl group has 2–10 carbon atoms can be used such as diethyl phthalate, dibutyl phthalate, didecyl phthalate, butylbenzyl phthalate, dicyclohexyl phthalate, and mixtures thereof.

Other esters such as butylbenzyl phatalate, diethyl adipate and sucrose benzoate can also be used.

Up to 6 percent by weight of a non-reactive polyester resins can also be used as a plasticizer. Typical polyesters are, for example, alkylene glycol esters of adipic and benzoic acid such as ethylene glycol adipate benzoate, neopentyl glycol adipate benzoate, ethylene glycol adipate benzoate phthalate and the like. Plasticizers of oil free or oil modified alkyd resins and polyesters and epoxidized soya bean oil can also be used.

Mixtures of the above polymeric plasticizers and monomeric plasticizers can be used such as a mixture of ethylene glycol adipate benzoate and diethyl phthalate, neopentyl glycol adipate benzoate and dibutyl phthalate and the like.

About 0.02-5.0 percent by weight of an acid catalyst blocked with a blocking agent is utilized in the novel powder coating composition of this invention. Any composition can be used which will yield free acid groups to catalyze the reaction when the powder coating composition is baked. Preferably a blocked paratoluene sulfonic acid is used. In particular, a paratoluene sulfonic acid blocked with a low molecular weight epoxy resin is preferred.

One preferred epoxy resin used as a blocking agent is glyceryl glycidyl ether of the formula

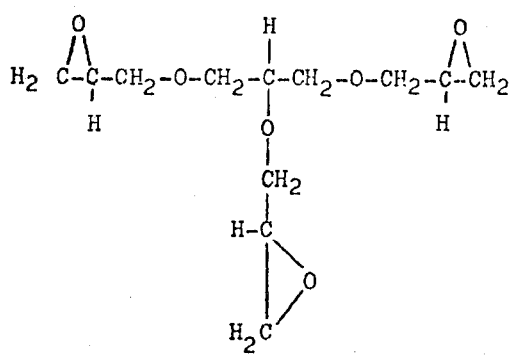

One preferred resin of this type is "Epon" 812. Another useful epoxy resin used as a blocking agent is of the formula

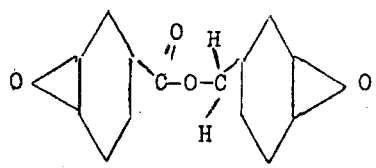

About 8 parts of one of the aforementioned epoxy resins to about 1 part of paratoluene sulfonic acid are used to provide a high quality blocked catalyst.

To improve resistance to popping and improve the flow of the novel powder coating composition of this invention about 0.5-2 percent by weight of the aforementioned epoxy resin is added to the novel powder coating composition in addition to the amount used in the blocked acid catalyst.

Amine salts of alkyl acid phosphates such as the N-methyldiethanolamine salt of butyl acid phosphate can be utilized as the blocked acid catalyst to form a high quality powder coating composition which cures to a high quality finish.

A silicone resin can be added to the novel powder coating composition of this invention to enhance flow and reduce cratering. Any of the conventional silicone resins or oils in amounts of 0.01-2.0 percent by weight can be used for this purpose.

Generally pigments are used in a powder coating composition of this invention in amounts of 0.2-50 percent by weight of the powder particles. Examples of the great variety of pigments which can be used in the novel powder coating composition of this invention are metallic oxide, preferably titanium dioxide, zinc oxide, iron oxide, and the like, metallic flake, such as aluminum flake, metallic powders, metal hydroxides, "Afflair" pigments, for example, mica flake coated with titanium dioxide, sulfides, sulfates, carbonates, carbon black, silica, talc, china clay, and other extender pigments, organic pigments, such as the copper phthalocyanines, organic dyes and lakes.

Preparation of the Novel Powder Coating Composition to prepare the novel powder coating composition of this invention, the acrylic polymer solution or emulsion is blended with a cellulose acetate butyrate, and alkylated melamine formaldehyde resin, the dihydroxy functional plasticizers and optionally any other plasticizers and the blocked acid catalyst along with pigments, pigment dispersions and other additives such as the aforementioned silicone resin and the like.

The pigment dispersions utilized in powder coating composition of this invention are prepared by conventional techniques such as sand grinding, pebble milling, ball milling and the like of the acrylic polymer solution or dispersion with the above pigments.

Another method for preparing a pigment dispersion in a two-roll mill. It is used to prepare pigment chips which are then formed into a pigment dispersion. Generally, the pigments and the cellulose acetate butyrate or the acrylic polymer along with volatile non-solvents for the polymer and plasticizer are blended together and then the mixture is place on a two-roll mill and the mixture is throughly milled to disperse the pigments in the vehicle and form pigment chips. These chips are then blended with a solvent to form a pigment dispersion which is utilized as indicated above.

One method for forming a powder composition from the above prepared mixture is to charge the mixture into a vacuum extruder which flashes off the solvent or water and leaves a solid material which is then ground into powder particles. Commercial spray drying equipment can also be used to form a powder. The powder is then passed through a sieve with openings about 75 microns, and preferably, 53 microns, to remove large particles.

When the vacuum extruder is used to prepare a powder, the above prepared mixture is charged into the vacuum extruder. The extruder is operated under a vacuum of about 22-25 inches of mercury, and a temperature of about 60°-90°C. and the solvent or water is removed from the composition and a 100 percent solids extrudate is produced. The extrudate is then reduced to a powder using conventional grinding equipment, for example, a pin disc mill, a fluid energy mill or a hammer mill can be used. After grinding, the powder is passed through a sieve to remove large particles. Usually a 270 mesh sieve (53 micron size) is used.

A two-roll mill is another technique that can be used to prepare the powder coating. The pigment chips or pigment dispersion, the acrylic polymer dispersion or solution, cellulose acetate butyrate, alkylated melamine formaldehyde resin, plasticizer, blocked acid catalyst and the other additives are charged into a two-roll mill and milled together. The resulting composition is then ground to form the novel powder coating composition.

Optionally, about 0.05–0.5 percent by weight of finely divided silica can be blended with the novel powder coating composition of this invention to eliminate caking of the powder and improve its handling and spraying properties.

Application of the Powder Novel Powder Coating Composition

The novel powder coating composition of this invention is then applied to a metal, glass, plastic or fiber reinforced plastic substrate by electrostatic spraying techniques or by using a fluidized bed or an electrostatic fluidized bed. Preferably, electrostatic spraying is utilized in which a voltage of 20 to 100 kilovolts is applied to the gun. The composition is applied in several passed to provide a thickness after fusion of 0.5–6 mils, preferably 2–3 mils, and then baked at 150°–180°C. for 15–45 minutes to fuse the powder particles into a continuous uniform finish.

Preferably, the novel coating composition of this invention is applied over a suitably treated and primed metal substrate. Typical alkyd primers or epoxy primers pigmented with iron oxide, carbon black, titanium dioxide and the like can be used. Also, the novel composition can be used directly over galvanized or phosphatized steel to form a durable coating. An electrically conductive carbon black pigment can be added to the primer to make the surface conductive and promote uniform deposition of the powder while spraying.

Electrodeposited primers can be used on the metal substrate. Typical electrodeposited primer compositions have as the film-forming constituents about 50–95 percent by weight of a carboxylic acid polymer having an acid number of 5–200 and correspondingly about 5–50 percent by weight of a cross-linking agent.

The following are examples of carboxylic polymers used in these primer compositions; maleinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as, drying oil fatty acids; esterified epoxy resins such as, and epoxy-hydroxy polyether resin esterified with conventional drying oil fatty acid which can be further acidified with maleinized drying oils; acrylic polymers; polyesters; trimellitic anhydride alkyd resins; styrene/allyl alcohol copolymers reacted with a carboxylic acid constituent and the like.

The following are typical cross-linking agents used with the above carboxylic polymers to form conventional primers and primers that can be electrodeposited: melamine formaldehyde, alkylated melamine formaldehyde, urea formaldehyde, benzoguanamine formaldehyde, toluene sulfonamide resins; one preferred cross-linking agent is hexa(methoxymethyl) melamine. Other cross-linking agents such as, amines and other compatible hydroxyl terminated compounds can also be used.

The following Examples illustrate the invention. All quantities are on a weight basis unless otherwise indicated.

EXAMPLE 1

An acrylic polymer solution is prepared as follows:

| Portion 1 | Grams |
| --- | --- |
| Methyl methacrylate monomer | 784.0 |
| Lauryl methacrylate monomer | 37.0 |
| 2-Hydroxy ethyl acrylate monomer | 50.0 |
| Methyl ethyl ketone | 117.0 |
| Toluene | 109.0 |
| 2-Mercapto ethanol | 12.2 |
| Portion 2 | |
| Azo-bis-isobutyronitrile | 1.3 |
| Methylethyl ketone | 20.0 |
| Total | 1130.5 |

Portions 1 and 2 are each blended together. Portion 1 is charged into a polymerization vessel equiped with a thermometer, stirrer, reflux condenser, addition funnel and a heating mantel and the ingredients are heated to 98°C. and then Portion 2 is added.

A monomer solution and a solvent catalyst solution are prepared as follows:

| Monomer Solution | Grams |
| --- | --- |
| Methyl methacrylate monomer | 500.0 |
| Lauryl methacrylate polymer | 26.0 |
| 2-Hydroxy ethyl acrylate | 44.0 |
| Total | 570.0 |

| Solvent Catalyst Solution | Grams |
| --- | --- |
| Methylethyl ketone | 48.0 |
| Toluene | 333.0 |
| Azo-bis-isobutyronitrile | 28.0 |
| Total | 509.0 |

The above prepared monomer solution and solvent catalyst solution are added to the reaction vessel over the following time periods while the reaction vessel is maintained during these addition periods at about 98°C. In each case the monomer solution and the solvent catalyst solution are premixed before addition to the reaction mixture. The following table shows a time over which each of the additions of monomer and solvent catalyst solution is made:

| Time (Minutes) | Monomer Solution (Cubic Centimeters) | Solvent Catalyst Solution (Cubic Centimeters) |
| --- | --- | --- |
| 2.5–15 | 225 | 120 |
| 15–30 | 182 | 205 |
| 30–45 | 138 | 205 |
| 45–60 | 51 | 40 |
| 60–100 | 14 | 30 |
| 100–115 | 0 | 24.0 |

After the above ingredients are added the reaction mixture is maintained at about 95°C. for an additional 15 minutes and then diluted with 760 grams of acetone. The resulting polymer solution has a solids content of 50.8 percent.

The polymer is a methyl methacrylate/lauryl methacrylate/hydroxyethyl acrylate in a weight ratio of 89/4/7. The polymer has a number average molecular weight of 9,000 and a weight average molecular weight of about 16,000 determined by gel permeation chromotography and a calculated glass transition temperature of about 80°C. determined by scanning calorimetry.

A mill base is prepared as follows:

| | Parts by Weight |
|---|---|
| Acrylic polymer solution (prepared above) | 250.0 |
| Titanium dioxide pigment | 307.0 |
| Ferrite yellow orange pigment (iron oxide pigment) | 193.0 |
| Toluene | 140.0 |
| Methylethyl ketone | 210.0 |
| Total | 1100.0 |

The above ingredients are premixed for about one hour and charged with a conventional sand mill and ground for 45 minutes to a 0.2 mil fineness.

A blocked acid catalyst solution is then prepared as follows:

| | Parts by Weight |
|---|---|
| Paratoluene sulfonic acid | 4 |
| Epon 812 (epoxy resin of glyceryl) glycidyl ether having the aforementioned formula) | 32 |
| Isopropanol | 64 |
| Total | 100 |

The acid is added to the isopropanol and then the epoxy resin is added with mixing while the constituents are at room temperature to form the blocked acid catalyst solution.

A liquid composition is then prepared:

| | Parts by Weight |
|---|---|
| Acrylic polymer solution (prepared above) | 319.0 |
| Cellulose acetate butyrate (55% butyryl content and a 0.02 second viscosity) | 54.0 |
| "Cymel" 300 [hexa(methoxymethyl) melamine] | 24.0 |
| Silicon anti-cratering agent (low molecular weight silicon oil) | 0.9 |
| Blocked acid catalyst solution (prepared above) | 8.0 |
| Dihydroxy functional plasticizer (hydroxyl terminated polycapralactone having a number average molecular) weight of 1250) | 30.0 |
| Didecyl phthalate | 12.0 |
| Methylethyl ketone | 150.0 |
| Pigment dispersion (prepared above) | 93.0 |
| Total | 690.9 |

The above composition is sprayed dried by spraying the composition with a suction type gun at 80 pounds per square inch pressure into a 50-gallon drum that is open at both ends and placed in a horizontal position. One end of the drum is covered with a 140 mesh nylon cloth to retain the powder particles and the other end of the drum with polyethylene having one opening therein through which the powder is sprayed. The powder is then placed into a vacuum oven overnight and then dried. The resulting powder particles are uniform and non-sticky.

The powder is then sprayed onto a number 20 gauge phosphatized steel panel using a model 322 Ransburg electrostatic powder gun. The powder is delivered from a reservoir to the gun by means of an air stream. The gun utilizes 40 kilowatts of the electricity to charge the powder particles and 60 pounds per square air pressure. The panels then are prebaked for 15 minutes at 150°C. and for about 30 minutes at 165°C. The film is smooth, even and has an excellent appearance and is free from popping and cratering. The resulting film thickness is about 1.5 to 3.0 mils and the film has a 20° gloss of 78–82, a Knoop hardness of 13–16 and passes 15 humidity cold crack cycle tests without cracking of the finish.

EXAMPLE 2

A composition is prepared as follows:

| | Parts by Weight |
|---|---|
| Acrylic polymer solution (50.8% solids prepared in Example 1) | 324.0 |
| Cellulose acetate butyrate (55% Butyryl content and a 0.02 second viscosity) | 54.0 |
| "Cymel" 300 [hexa(methoxymethyl) melamine] | 30.0 |
| Dihydroxyl functional plasticizer (hydroxyl terminated polycaprolactone resin having a molecular weight of 2,000) | 36.0 |
| Blocked acid catalyst solution (prepared in Example 1) | 8.0 |
| Silicon anti-cratering agent (low molecular weights silicone oil) | 0.9 |
| Methylethyl ketone | 140.0 |
| Mill base (prepared in Example 1) | 90.0 |
| Total | 682.9 |

A powder coating composition is prepared using the procedure described in Example 1 and the composition is sprayed onto phosphatized steel panels using the same procedure as in Example 1 and prebaked for 15 minutes at 150°C. and baked for 30 minutes at 165°C. The resulting film is 1.5 to 3.0 mils thick and has a good appearance, good gloss and is free from popping and cratering and is resistant to aromatic solvents such as toluene and has a hardness of about 14 Knoops.

EXAMPLE 3

An acrylic polymer solution is prepared using the procedure of Example 1 giving an acrylic polymer solution having a 55 percent solids content and an acrylic polymer of methyl methacrylate/lauryl methacrylate/hydroxyethyl acrylate in a weight ratio of 90/4/6 and having a number average molecular weight of 7,000 and a weight average molecular weight of 14,000 determined by gel permeation chromatography and a calculated glass transition temperature of about 82°C.

A mill base is prepared as follows:

|  | Parts by Weight |
|---|---|
| Acrylic polymer solution (prepared above) | 492.0 |
| Titanium dioxide pigment | 307.0 |
| Ferrite yellow orange pigment (iron oxide pigment) | 193.0 |
| Toluene | 43.2 |
| Methylethyl ketone | 64.8 |
| Total | 1,100.0 |

The above ingredients are premixed for one hour and then dried into a conventional sand mill and ground to a 0.2 mil fineness.

A liquid dispersion is prepared as follows:

|  | Parts by Weight |
|---|---|
| Acrylic polymer solution (prepared above) | 212.0 |
| Cellulose acetate butyrate solution (33% solids in methylethyl ketone and the cellulose acetate butyrate has a 55% butyryl content and a viscosity of 0.2 seconds) | 96.0 |
| "Cymel" 300 [hexa(methoxymethyl) malamine] | 18.0 |
| Dihydroxyl terminated plasticizer (hydroxyl terminated polycaprolactone having a number average molecular weight of 500) | 20.0 |
| Didecyl phthalate | 14.0 |
| Silicone anti-cratering agent (low molecular weight silicone oil) | 0.6 |
| Blocked catalyst solution (prepared in Example 1) | 3.0 |
| Methylethyl ketone | 35.0 |
| Mill base (prepared above) | 49.0 |
| Total | 447.6 |

A powder coating composition is prepared using the procedure of Example 1. The powder is then sprayed onto phosphatized steel panels using the same procedure as in Example 1 and the panels are prebaked at 150°C. for 15 minutes and baked for 30 minutes at 165°C. giving a film with excellent appearance which is free from cratering and has a smooth and even surface. The film is resistant to aromatic solvents such as toluene and has a hardness of about 14 Knoops.

EXAMPLE 4

The following mill bases are prepared:

| White Mill Base | Parts by Weight |
|---|---|
| Acrylic polymer solution (50% solids solution of a copolymer of methyl methacrylate/lauryl methacrylate/hydroxyethyl acrylate in a weight ratio of 90.4/3.3/6.3 having a weight average molecular weight of about 17,000, in a solvent mixture of toluene/methylethyl ketone/acetone) | 125.0 |
| Titanium dioxide pigment | 125.0 |
| Toluene | 30.0 |
| Methylethyl ketone | 15.0 |
| Total | 300.0 |

The above ingredients are thoroughly mixed together and then ground in a conventional sand mill to form a mill base having a solids content of 67 percent, containing 22.3 percent pigment, and 44.7 percent polymer.

| Black Mill Base | Parts by Weight |
|---|---|
| Acrylic polymer solution (described above) | 480.0 |
| Methylethyl ketone | 264.0 |
| Toluene | 144.0 |
| Ethylene glycol monoethyl ether acetate | 72.0 |
| Carbon black chips (prepared on a two-roll mill and ground to a No. 40 mesh size of carbon black/cellulose acetate butyrate, having a .02 second viscosity and a 55 percent butyryl content/polyester plasticizer in a weight ratio of 20/64/16) | 240.0 |
| Total | 1,200.0 |

The above ingredients are blended together and stirred for 1 hour to dissolve the pigment chips, then the mixture is stirred vigorously with an Eppenbach homomixer for one hour. The weight loss due to the solvent evaporation is made up with additional solvent. the resulting 40 percent solids mill base is an excellent dispersion of the carbon black pigment.

| Irgazine Yellow Mill Base | Parts by Weight |
|---|---|
| Acrylic polymer solution (described above) | 383.0 |
| Methylethyl ketone | 317.9 |
| Toluene | 168.5 |
| Ethylene glycol monoethyl ether acetate | 75.3 |
| Irgazine yellow chips (irgazine yellow pigment/cellulose acetate butyrate having a 0.02 second viscosity and a 55 percent butyryl content/butylbenzyl phthalate in a weight ratio of 47/48/5, two roll chips milled 25 minutes on a two-roll machine and ground to a No. 40 mesh size) | 255.3 |
| Total | 1,200.0 |

The above ingredients are thoroughly blended together and agitated as above giving a 37 percent solids mill base that has a good dispersion of the Irgazine yellow pigment.

Phthalocyanine Green Mill Base

The phthalocyanine green/cellulose acetate butyrate, 55 percent butyrl content and 0.02 second viscosity/butylbenxyl phthalate (47/48/5), two roll chip is prepared and ground to a No. 40 mesh size, and then blended as above with the acrylic polymer solution, toluene, methylethyl ketone, and ethylene glycol monoethyl ether acetate to form a 37 percent solids mill base, having an excellent dispersion of the phthalobyanine green pigment.

A catalyst solution is then prepared as follows:

| | Parts by Weight |
|---|---|
| Butyl acid phosphate (acid equivalent, 113) | 10.00 |
| Isopropanol | 30.76 |
| N-methyl diethanolamine (to bring the solution to pH 7.0) | 9.24 |
| Total | 50.00 |

The above ingredients are thoroughly mixed together to form the acid catalyst solution.

The following enamels are then prepared and then formulated into a powder coating composition:

| | ENAMEL "A" Parts by Weight | ENAMEL "B" Parts by Weight |
|---|---|---|
| Acrylic polymer solution (50% solids polymer solution in toluene/methylethyl ketone/acetone of a polymer of methylmethacrylate/lauryl methacrylate/hydroxyethylacrylate/methacrylic acid in a weight ratio of 89.4/3.3/6.3/1 having a calculated glass transition temperature of 84°C. having a weight average molecular weight of 15,000) | 169.10 | 169.10 |
| N-methyldiethanolamine | 1.17 | 2.67 |
| Cellulose acetate butyrate solution (40 percent solids in methylethyl ketone of cellulose acetate butyrate having a 55 percent butyryl content and a 0.02 second viscosity) | 36.40 | 36.40 |
| "Cymel" 300 [hexa-(methoxymethyl)-melamine] | 12.00 | 12.00 |
| Polycaprolactone (50 percent solids solution of hydroxy-terminated polycaprolactone having a molecular weight of 1250, and dissolved in methylethyl ketone) | 27.00 | 27.00 |
| Didecylphthalate | 4.50 | 3.00 |
| Silicone solution (50 percent solids solution in toluene of the low molecular weight silicone resin) | 0.90 | 0.90 |
| Catalyst solution (prepared above) | 2.25 | 2.25 |
| White mill base (prepared above) | 1.50 | 1.50 |
| Black mill base (prepared above) | 20.60 | 20.60 |
| Yellow mill base (prepared above) | 29.25 | 29.25 |
| Green mill base (prepared above) | 22.80 | 22.80 |
| Total | 327.47 | 327.47 |

The enamels were thinned with acetone to a 38 second viscosity in a No. 1 Zahn cup, then spray-dried by the procedure described in Example 1. The powders were then dryblended with about 0.1 percent by weight of CAB-O-SIL M-5 (finely-divided fumed silica), and then dried again, passed through a 270-mesh sieve, as described above, to form the powder coating composition which is stable at room temperature.

Phosphatized steel panels primed with a standard automotive electrodeposited alkyd resin primer, and sealed with a conductive sealer coat were electrostatically coated with the resulting powders A and B, then baked as shown in the following Table:

| | Powder Coating A | Powder Coating B |
|---|---|---|
| Baking cycle | 10 min. at 120°C.; | 10 min. at 120°C.; |
| | 20 min. at 145°C.; | 20 min. at 145°C.; |
| | 20 min. at 165°C.; | 40 min. at 165°C.; |
| Post-Bake | 35 min. at 168°C.; | NONE |
| Coating Thickness (mils) | 2.3 | 2.5 |
| 20° Gloss | 76 | 79 |
| Appearance | Acceptable appearance, some orange peel | Acceptable appearance, slight orange peel |
| Tape Adhesion | Excellent | Good |

Enamel "B" contains about 1 percent (based on the total weight of the vehicle) of methyldiethanolamine in excess of the amount required to neutralize the methacrylic acid in the acrylic copolymer. This replaces an equal weight of didecylphthalate plasticizer. As shown above, powders of Enamels "A" and "B," when formed into coatings, have acceptable film properties.

The invention claimed is:

1. A thermosetting acrylic polymer powder coating composition comprising finely divided particles having a particle size of 1-100 microns; wherein the powder particles are an intimately mixed blend of film-forming constituents consisting essentially of
   A. 50-85 percent by weight of an acrylic polymer consisting essentially of
      1. 70-97 percent by weight, based on the weight of the acrylic polymer, of methyl methacrylate, styrene or a mixture of a methyl methacrylate and styrene,
      2. 1-10 percent by weight, based on the weight of the acrylic polymer, of an alkyl acrylate having 2-12 carbon atoms in the alkyl group or an alkyl methacrylate having 8-12 carbon atoms in the alkyl group,
      3. 2-20 percent by weight, based on the weight of the acrylic polymer, of a hydroxyalkyl acrylate or hydroxyalkyl methacrylate having 2-4 carbon atoms in the alkyl groups;
   wherein the acrylic polymer has a glass transistion temperature of about 71°-95°C. and a weight average molecular weight of 10,000-25,000;
   B. 5-25 percent by weight of cellulose acetate butyrate having a viscosity of 0.005-2.0 seconds measured at 25°C. according to ASTM-D-1343-56 and having a butyryl content of about 30-60 percent by weight;
   C. 4.98-25 percent by weight of an alkylated melamine formadehyde resin having a ratio of —CH$_2$OR groups to —CH$_2$OH groups at least 5:1 where R is an alkyl group having 1-8 carbon atoms;
   D. 5-15 percent of dihydorxy functional plasticizer having a number average molecular weight of about 520-4,000; and
   E. 0.02-5.0 percent by weight of an acid catalyst blocked with a blocking agent.

2. The powder coating composition of claim 1 containing about 0.2-50 percent by weight of pigment.

3. The coating composition of claim 2 in which the acrylic polymer consists essentially of 85-94 percent by weight of methyl methacrylate, 1-5 percent by weight of lauryl methacrylate and 4-10 percent by weight of hydroxyethyl acrylate.

4. The powder coating composition of claim 3 in which the cellulose acetate butyrate has a viscosity of 0.008-0.02 seconds and a butyryl content of 50-60 percent by weight.

5. The powder coating composition of claim 4 in which the alkylated melamine formaldehyde resin is hexa(methoxymethyl) melamine.

6. The powder coating composition of claim 5 in which the acid catalyst is a blocked paratoluene sulfonic acid catalyst.

7. The powder coating composition of claim 6 in which the paratoluene sulfonic acid catalyst is blocked with a low molecular weight aliphalic or cycloaliphatic epoxy resin.

8. The powder coating composition of claim 7 in which the dihydroxy functional plasticizer is a polyester resin having a molecular weight of 520-4,000.

9. The powder coating composition of claim 7 in which the dihydroxy functional plasticizer is polycaprolactone having a molecular weight of 520-2,000.

10. The thermosetting acrylic polymer powder coating composition of claim 2 comprising finely divided particles having a particle size of 10-75 microns; wherein the powder particles are an intimately mixed blend of film-forming constituents consisting essentially of
    A. 55-65 percent by weight of an acrylic polymer consisting essentially of
       1. 85-94 percent by weight of methyl methacrylate,
       2. 1-5 percent by weight of lauryl methacrylate,
       3. 4-10 percent by weight of hydroxy ethyl acrylate,
    wherein the acrylic polymer has a weight average molecular weight of about 14,000-18,000;
    B. 12-20 percent by weight of cellulose acetate butyrate having a viscosity of 0.02-0.10 seconds and a butyryl content of 50-60 percent by weight;
    C. 7-12 percent by weight of hexa(methoxymethyl) melamine;
    D. 8-14 percent by weight of dihydroxy functional plasticizer of polyester resin having a molecular weight of 520-4,000;
    E. 0.02-1.0 percent by weight of paratoluene sulfonic acid catalyst blocked with a low molecular weight epoxy resin a glyceryl glycidyl ether.

* * * * *